US012620902B2

(12) United States Patent
Drofenik et al.

(10) Patent No.: US 12,620,902 B2
(45) Date of Patent: May 5, 2026

(54) BI-DIRECTIONAL MEDIUM VOLTAGE TO LOW VOLTAGE CONVERTER TOPOLOGY

(71) Applicant: ABB E-mobility B.V., Delft (NL)

(72) Inventors: Uwe Drofenik, Zürich (CH); Francisco Canales, Baden-Dättwil (CH); Daniel Rothmund, Mülligen (CH)

(73) Assignee: ABB E-MOBILITY B.V., Delft (NL)

( * ) Notice: Subject to any disclaimer, the term of this patent is extended or adjusted under 35 U.S.C. 154(b) by 811 days.

(21) Appl. No.: 17/884,723

(22) Filed: Aug. 10, 2022

(65) Prior Publication Data

US 2023/0048596 A1     Feb. 16, 2023

(30) Foreign Application Priority Data

Aug. 13, 2021     (EP) ..................................... 21191272

(51) Int. Cl.
*H02M 3/335* (2006.01)
*H02M 7/72* (2006.01)
*H02M 7/797* (2006.01)

(52) U.S. Cl.
CPC ... *H02M 3/33584* (2013.01); *H02M 3/33573* (2021.05); *H02M 7/72* (2013.01); *H02M 7/797* (2013.01)

(58) Field of Classification Search
CPC ......... H02M 3/33584; H02M 3/33573; H02M 7/72; H02M 7/797; H01F 30/12
See application file for complete search history.

(56) References Cited

U.S. PATENT DOCUMENTS

| | | | | |
|---|---|---|---|---|
| 5,446,642 | A * | 8/1995 | McMurray | ............ H01F 27/385 |
| | | | | 363/43 |
| 5,515,264 | A * | 5/1996 | Stacey | .................... H02M 7/49 |
| | | | | 363/64 |
| 6,301,130 | B1 * | 10/2001 | Aiello | ..................... H02M 7/49 |
| | | | | 363/39 |

(Continued)

FOREIGN PATENT DOCUMENTS

| | | |
|---|---|---|
| CN | 105680706 A | 6/2016 |
| CN | 110071648 A | 7/2019 |

(Continued)

OTHER PUBLICATIONS

Faruque et al., "Hardware-in-the-Loop Simulation of Power Electronic Systems Using Adaptive Discretization," *IEEE Transactions on Industrial Electronics*, 57(4): 1146-1158 (Apr. 2010).

(Continued)

*Primary Examiner* — Yusef A Ahmed
(74) *Attorney, Agent, or Firm* — McCarter & English, LLP; Michael M. Gnibus

(57) ABSTRACT

A bi-directional medium voltage converter topology includes an n-pulse line-interphase-transformer, LIT; a plurality of bi-directional medium voltage, MV converters connected to the LIT on an AC side thereof and connected in parallel on a DC side thereof; a bi-directional multi-stage DC/DC converter connected to the plurality of bi-directional MV converters; and a bi-directional low voltage, LV, DC/DC converter; wherein the multi-stage DC/DC converter and the LV DC/DC converter are connected to each other galvanically insulated.

9 Claims, 10 Drawing Sheets

(56)　　　　　References Cited

U.S. PATENT DOCUMENTS

| | | | | |
|---|---|---|---|---|
| 7,050,311 | B2 * | 5/2006 | Lai | H02M 5/225 363/37 |
| 10,581,341 | B2 * | 3/2020 | Malipaard | H02M 7/49 |
| 10,790,697 | B2 * | 9/2020 | Delanoe | H02M 3/24 |
| 11,070,136 | B2 * | 7/2021 | Dutta | H02M 3/33561 |
| 11,588,397 | B2 * | 2/2023 | Zhu | H02M 3/33571 |
| 12,132,406 | B2 * | 10/2024 | Mantov | H02M 3/1584 |
| 2008/0055947 | A1 * | 3/2008 | Wen | H02M 5/458 363/65 |
| 2010/0165688 | A1 | 7/2010 | Bendre et al. | |
| 2012/0218795 | A1 | 8/2012 | Mihalache | |
| 2013/0121043 | A1 * | 5/2013 | Pietkiewicz | H02M 7/06 363/40 |
| 2013/0201733 | A1 * | 8/2013 | Divan | H02M 5/00 363/39 |
| 2014/0152109 | A1 * | 6/2014 | Kanakasabai | H02J 9/062 307/64 |
| 2014/0247629 | A1 * | 9/2014 | Crane | H02M 7/521 363/35 |
| 2015/0162782 | A1 * | 6/2015 | Kanakasabai | H02J 9/062 307/23 |
| 2015/0171726 | A1 * | 6/2015 | Singh Riar | H02M 7/797 363/65 |
| 2017/0005565 | A1 * | 1/2017 | Bai | H02M 1/4258 |
| 2019/0052177 | A1 * | 2/2019 | Lu | H02M 7/217 |
| 2020/0119653 | A1 * | 4/2020 | Mariéthoz | H02M 7/4835 |
| 2021/0039500 | A1 * | 2/2021 | Li | B60L 7/12 |
| 2021/0111629 | A1 * | 4/2021 | Gray | H02M 1/15 |
| 2021/0111642 | A1 * | 4/2021 | Weyh | H02M 7/487 |
| 2021/0376739 | A1 * | 12/2021 | Liu | H02M 7/23 |
| 2021/0376753 | A1 * | 12/2021 | Liu | H02M 7/2173 |
| 2022/0149744 | A1 * | 5/2022 | Huber | H02M 1/0095 |
| 2022/0302848 | A1 * | 9/2022 | Yu | H02M 7/5387 |
| 2022/0345045 | A1 * | 10/2022 | Drofenik | H02M 7/4815 |
| 2022/0348101 | A1 * | 11/2022 | Keister | H02M 3/33584 |
| 2023/0049615 | A1 * | 2/2023 | Drofenik | H02M 5/18 |
| 2023/0049948 | A1 * | 2/2023 | Drofenik | H02M 1/088 |
| 2023/0050057 | A1 * | 2/2023 | Drofenik | B60L 53/67 |
| 2023/0050293 | A1 * | 2/2023 | Drofenik | H02J 7/02 |
| 2023/0068564 | A1 * | 3/2023 | Liu | H02M 7/493 |
| 2023/0115752 | A1 * | 4/2023 | Burkhardt | H02M 7/06 307/82 |
| 2023/0163675 | A1 * | 5/2023 | Zhang | H02M 7/483 307/82 |
| 2024/0048042 | A1 * | 2/2024 | Ferreira Costa | H02M 5/44 |
| 2024/0120738 | A1 * | 4/2024 | Valdivia | H02J 3/16 |
| 2024/0204673 | A1 * | 6/2024 | Peng | H02M 3/3353 |
| 2024/0313542 | A1 * | 9/2024 | Hui | H02M 1/007 |

FOREIGN PATENT DOCUMENTS

| | | |
|---|---|---|
| CN | 111697837 A | 9/2020 |
| DE | 3826524 C2 | 3/1995 |
| EP | 2662969 A1 | 11/2013 |
| WO | WO 93/23913 A1 | 11/1993 |
| WO | WO 2011/113471 A1 | 9/2011 |
| WO | WO 2011/154040 A1 | 12/2011 |

OTHER PUBLICATIONS

Viglus et al., "Hybrid Subsea Power Cable Emulator," *2019 IEEE Applied Power Electronics Conference and Exposition (APEC)*, pp. 3373-3379 (Mar. 17-21, 2019).

European Patent Office, Extended European Search Report in European Patent Application No. 21191272.0, 14 pp. (Dec. 8, 2021).

Office Action issued in counterpart Chinese Application No. 202210966910, dated Dec, 25, 2025.

\* cited by examiner

BI-DIRECTIONAL MEDIUM VOLTAGE TO LOW VOLTAGE CONVERTER TOPOLOGY

This patent application claims priority to European Patent Application No. 21191272.0, filed on Aug. 13, 2021, which is incorporated herein in its entirety by reference.

FIELD OF THE DISCLOSURE

The present invention relates to a bi-directional medium voltage converter topology, and a use of a bi-directional MV converter and a DC/DC converter employing medium frequency transformer in a LIT-based bi-directional medium voltage converter topology.

BACKGROUND OF THE INVENTION

For applications as renewables (PV solar, wind), storage (battery, hydrogen, fuel cells), large drives, EV charging and datacenter, where at least several Megawatt of electrical power are involved, the connection to the MV grid is done by a MV-to-LV AC/DC converter with galvanic insulation.

BRIEF SUMMARY OF THE INVENTION

In many of these applications, bi-directional power flow at low costs and with high efficiency is desirable.

The described embodiments similarly pertain to the bi-directional medium voltage converter topology, the use of a bi-directional MV converter and a DC/DC converter employing medium frequency transformer in a LIT-based bi-directional medium voltage converter topology, and the use of a bi-directional medium voltage converter topology in a photovoltaic solar power plant, a wind farm, a storage for a battery, hydrogen, fuel cell, a drive, an electric vehicle charging device, or a datacenter. Synergetic effects may arise from different combinations of the embodiments although they might not be described in detail.

Technical terms are used by their common sense. If a specific meaning is conveyed to certain terms, definitions of terms will be given in the following in the context of which the terms are used.

The following abbreviations are used in this disclosure:
MV medium voltage (typically 3 kV-50 kV)
LV low voltage (typically up to 1 kV)
MFT medium frequency transformer (operating at multiple times the mains frequency)
EV electric vehicle
HF high frequency (multiple times the mains frequency, e.g. 5 kHz-30 kHz)
LIT line-interphase-transformer (provides phase-shifted three-phase systems without galvanic insulation)
MLC multi-level converter (cell-based)
PV photovoltaic
AC Alternating Current
DC Direct Current
LIT line interphase transformer
According to a first aspect, a bi-directional medium voltage converter topology is provided. The converter comprises an n-pulse line-interphase-transformer (LIT), a plurality of bi-directional medium voltage (MV) converters connected to the LIT on AC side and connected in parallel on DC side, a bi-directional multi-stage DC/DC converter connected to the plurality of bi-directional MV converters, and a bi-directional low voltage (LV) DC/DC converter;

wherein the multi-stage DC/DC converter and the LV DC/DC converter are connected to each other galvanically insulated.

The topology allows a bi-directional power flow with a significant reduction of size and cost yet in one single direction and a small footprint of the whole system due to employment of MFTs and LITs. The topology is suited for a very broad scope, i.e. for many different applications such as renewables energy applications, for example, photovoltaic/solar and wind energy plants, energy storage for batteries or hydrogen or fuel cells, large drives, EV charging and datacenters. The topology can be realized at low-cost, is simple, reliable and robust.

BRIEF DESCRIPTION OF THE SEVERAL VIEWS OF THE DRAWING(S)

DETAILED DESCRIPTION OF THE INVENTION

Corresponding parts are provided with the same reference symbols in all figures.

Figure 1:
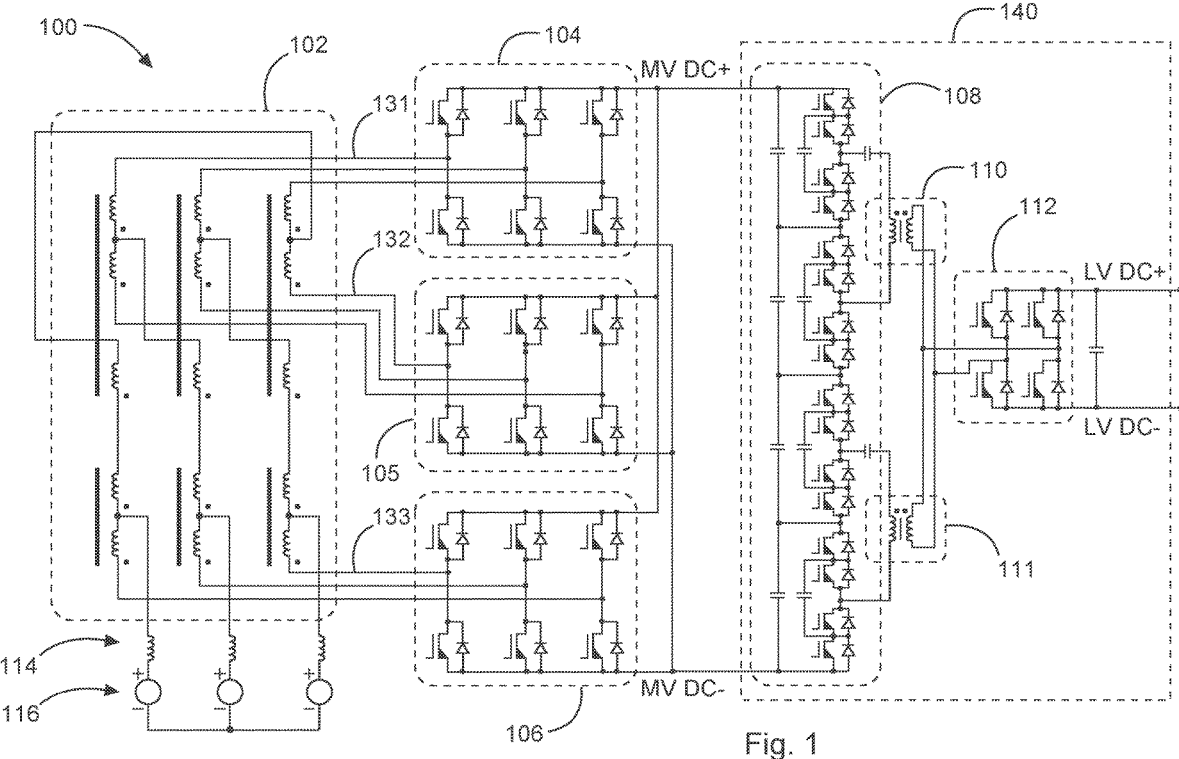
FIG. 1 shows a bi-directional medium voltage converter topology in accordance with the disclosure.

FIG. 1 shows a bi-directional medium voltage converter topology 100 comprising an 18-pulse LIT 102, a plurality of bi-directional MV converters 104 . . . 106 connected to the LIT on AC side and connected in parallel on DC side, i.e. at lines MV DC+ and MV DC−. The topology 100 further comprises a multi-stage DC/DC converter 108 connected to the plurality of bi-directional MV converters 104 . . . 106, and a LV DC/DC converter 112, and two medium frequency transformers (MFT) 110, 111. The multi-stage DC/DC converter 108 and the LV DC/DC converter 112 are connected to each other galvanically insulated, which is achieved by the MFTs 110, 111.

The LIT 102 is connected to the three-phase AC grid 116 via inductors 114, which is either the input to the complete converter or topology 100 or the output of the complete converter when working as inverter 100, i.e., depending on the direction, in which the topology 100 is operated. The inductors might be omitted if the grid impedance is large enough.

Although in this disclosure, the topology and the circuits are described in the AC to DC direction, the topology and the circuits can be operated in the inverse direction. The description applies to this inverse direction accordingly.

The LIT shifts the AC phases and provides three shifted AC phases to the MV converters 104 . . . 106. In case of an 18-pulse LIT and operation as AC to DC conversion, there are three outputs 131 . . . 133 from the LIT, each having three phases. Each output 131 . . . 133 is an input of one of the MV converters 104 . . . 106. Regarding one MV converter 104, each phases of output 131 is connected to a midpoint of a half bridge of MV converter 104. The three MV converters 104 are parallel connected with respect to their output on DC side. That is, they are connected to the line MV DC+ and to the line MV DC−, to which the multistage DC/DC converter 108 is connected. More exactly, the arrangement 108, the MFTs 110 and 11, and the arrangement 112 form a DC/DC converter with an MV input and an LV output. The arrangement 108 is referred to as MV multistage DC/DC converter 108 and arrangement 112 is referred to as LV DC/DC converter, although they are parts of the MV-to-LV DC/DC converter 140 with an AC interface realized by MFTs 100 and 111.

Figure 2A:
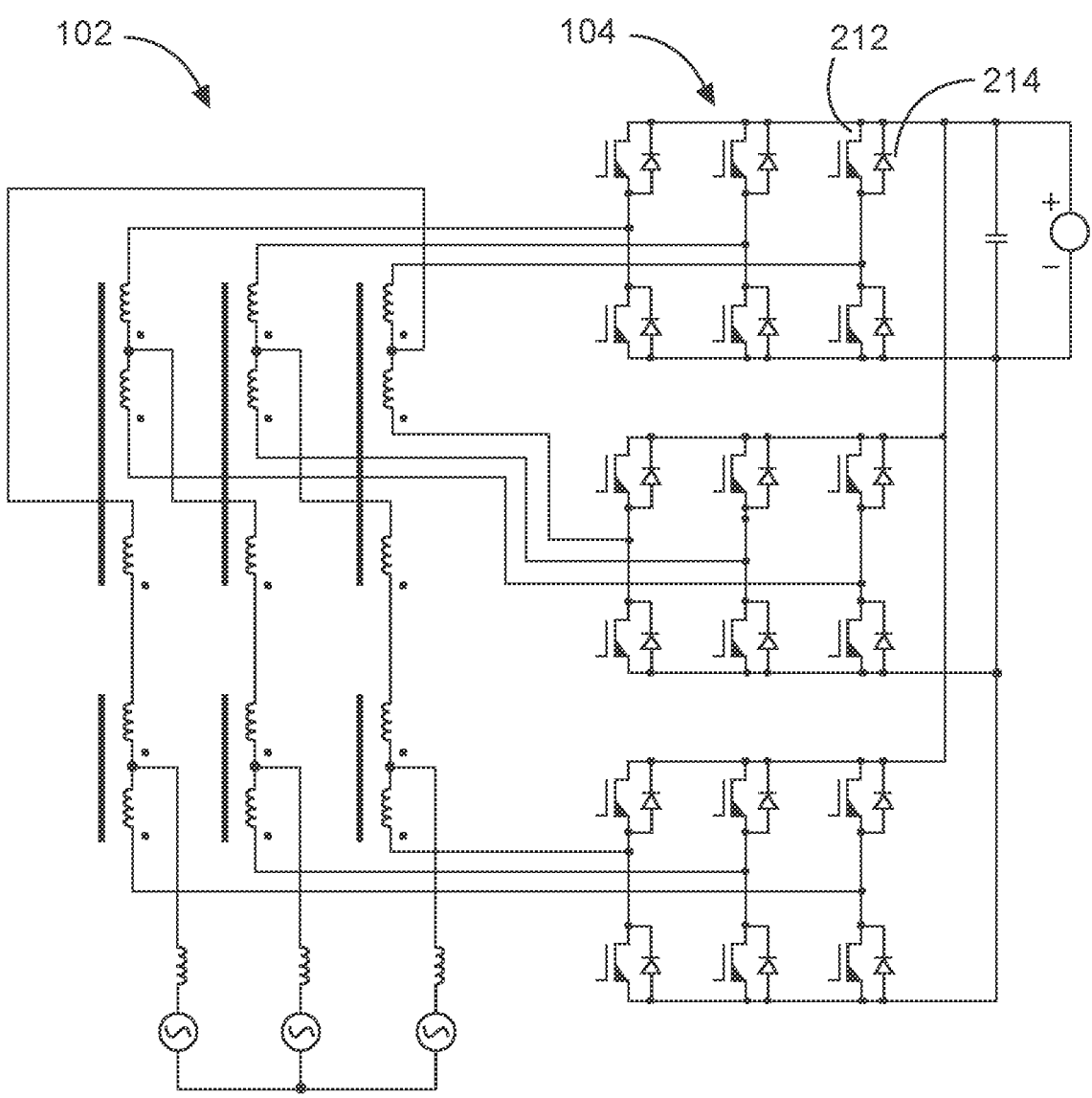
FIG. 2a shows a diagram of the bi-directional front-end employing a first semiconductor combination of the switches in accordance with the disclosure.
Figure 2B:
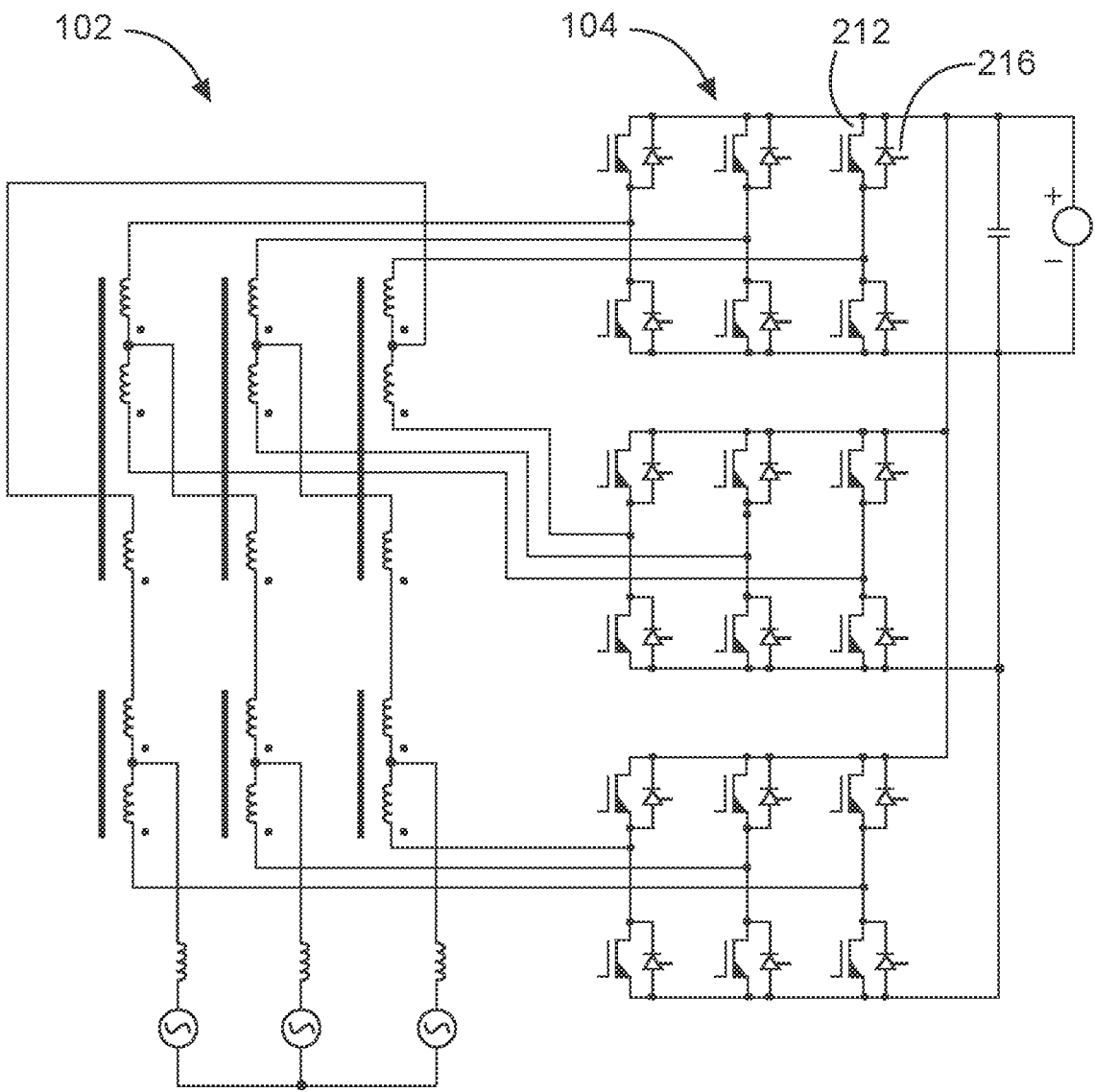
FIG. 2b shows a diagram of the bi-directional front-end employing a second semiconductor combination of the switches in accordance with the disclosure.
Figure 2C:
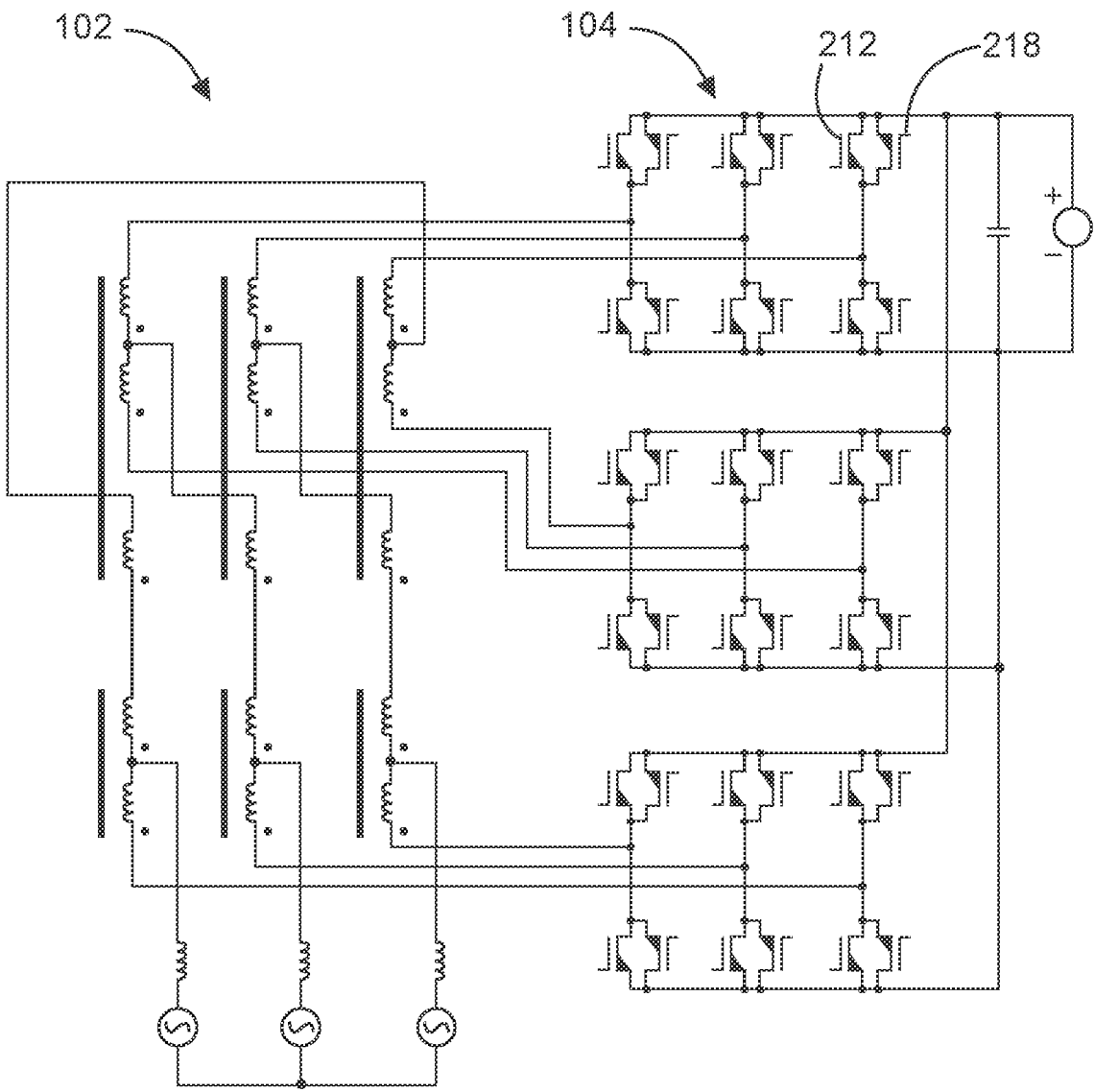
FIG. 2c shows a diagram of the bi-directional front-end employing a third semiconductor combination of the switches in accordance with the disclosure.

FIGS. 2a, 2b, and 2c show diagrams of embodiment of the bi-directional front-end 102, 104 employing different switches. FIG. 2a shows a diagram, where the switches are realized by insulated-gate bipolar transistors (IGBTs) 212 with antiparallel diodes 214. FIG. 2b shows a diagram, where the switches are realized by IGBTs 212 with antiparallel thyristors 216. FIG. 2c shows a diagram, where the antiparallel diodes are realized by anti-parallel active switches like IGBTs 218.

Figure 3A:
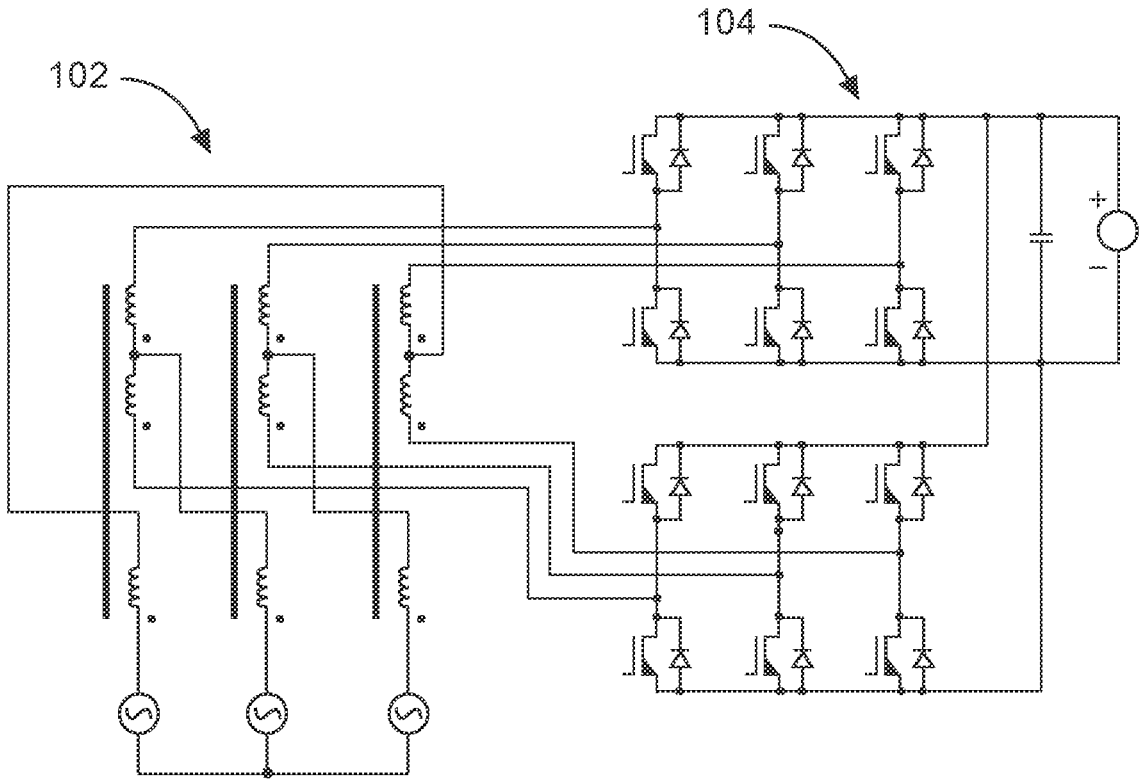
FIG. 3a shows a diagram of a 12-pulse LIT in accordance with the disclosure.
Figure 3B:
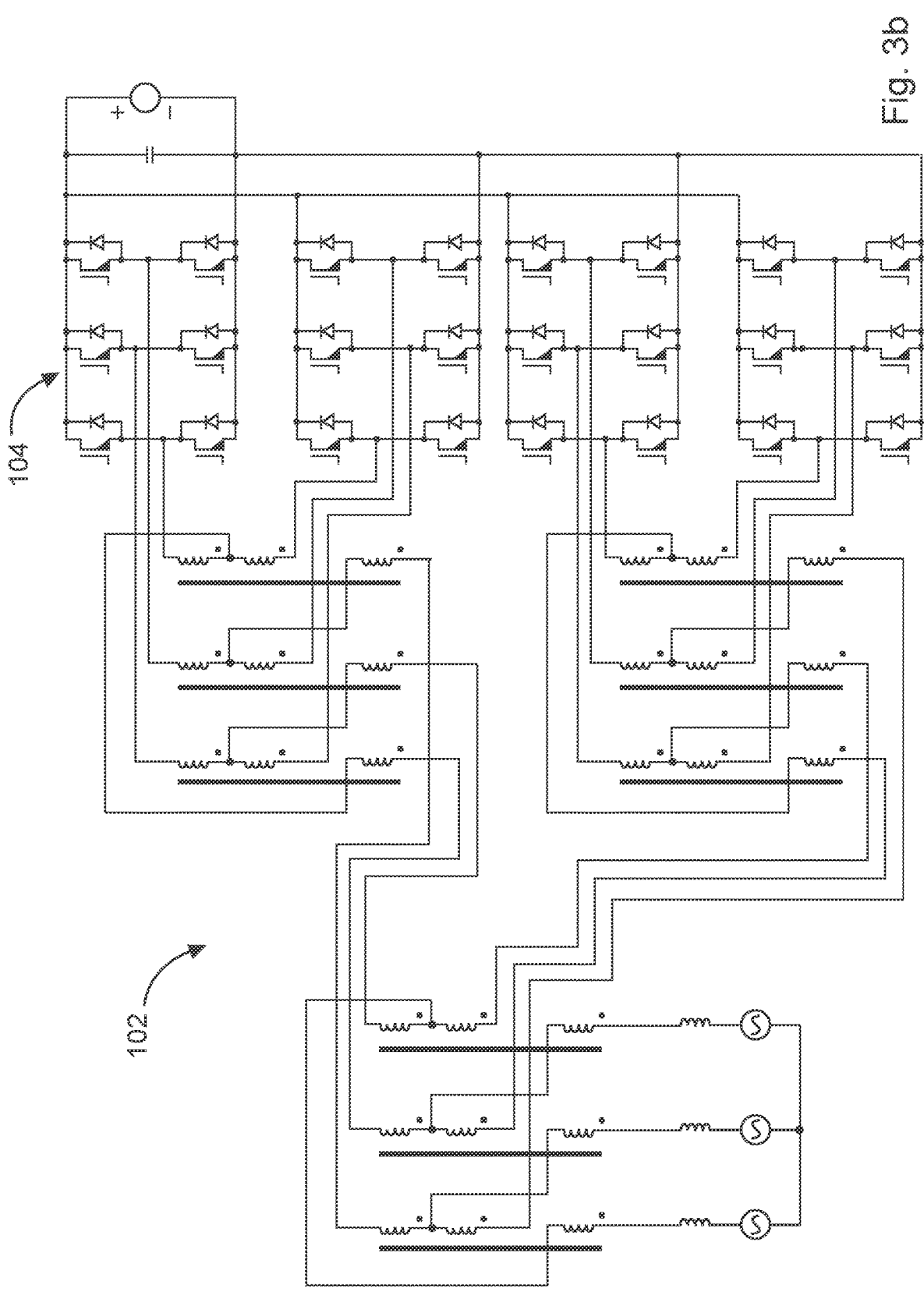
FIG. 3b shows a diagram of a 24-pulse LIT in accordance with the disclosure.

FIGS. 3a and 3b show LITs with different numbers of pulses. FIG. 3a shows a 12-pulse LIT and FIG. 3b a 24-pulse LIT. In principle, with three phases, any n=k*6-pulse LIT are possible arrangements, where k is a positive integer. The number of converters is k. The higher k, the lower is the load for each of the active switches. A significant advantage of a high pulse number (high number of k) is the reduction of the grid side current harmonics, which reduces the filtering effort, which would be required to fulfill the grid standards.

Figure 4A:
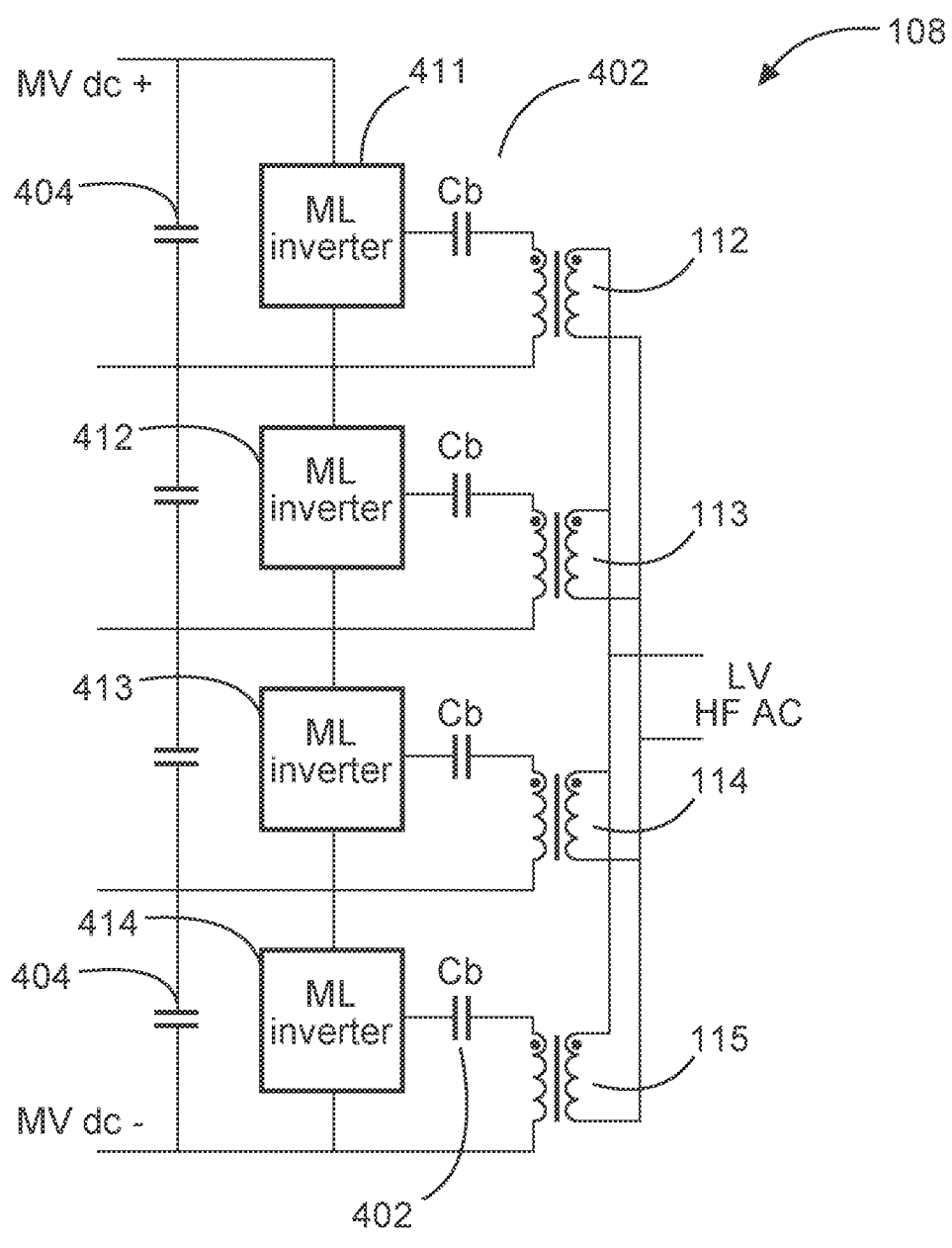
FIG. 4a shows a first embodiment of the MV DC/DC converter in accordance with the disclosure.
Figure 4B:
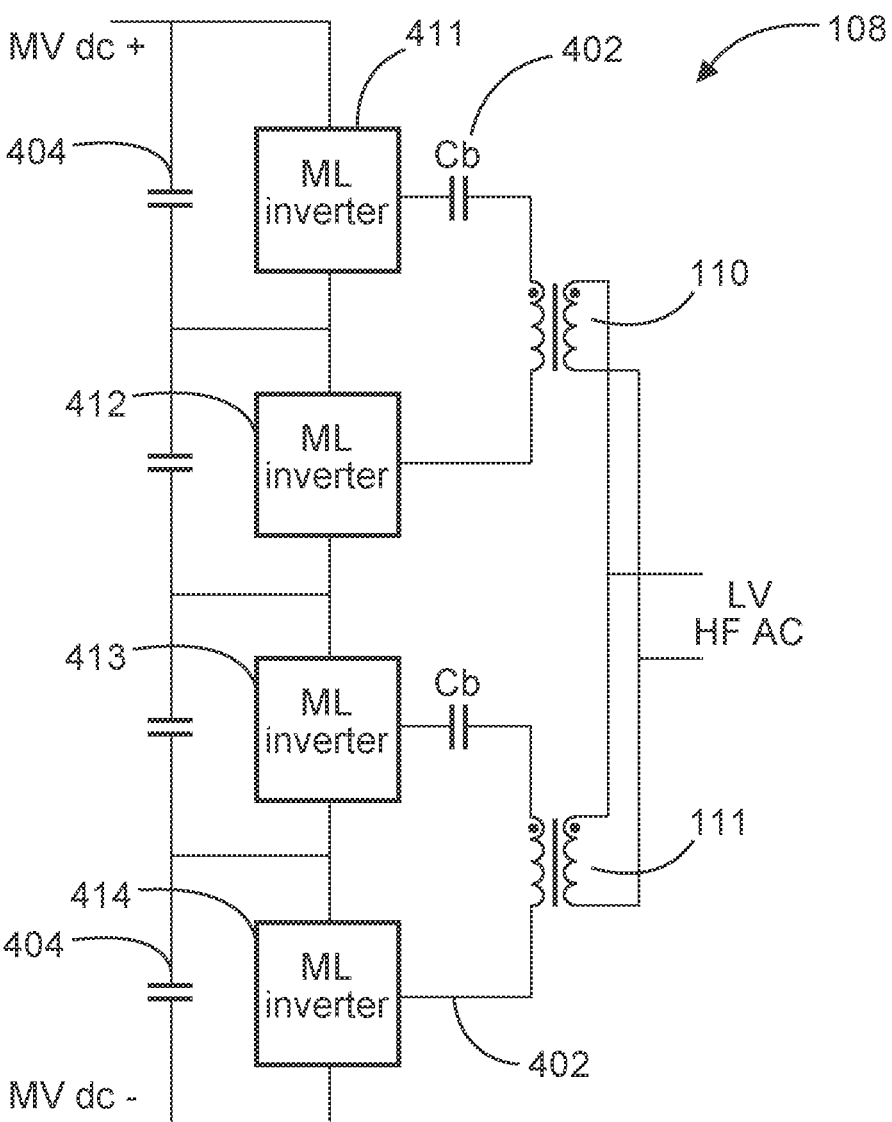
FIG. 4b shows a second embodiment of the MV DC/DC converter in accordance with the disclosure.

FIGS. 4a and 4b show different embodiments of the MV DC/DC converter 108 comprising multilayer inverters 411 . . . 414. Parallel to the ML inverters, capacitors 404 are connected for voltage balancing. More capacitors for voltage balancing may be arranged tapping the ML inverter at different positions between switches. The output of the ML inverters is connected to a respective capacitor 402, which is in series with the primary side of an MFT 110 . . . 115. The capacitor 402 and the primary MFT coil form a resonance circuit. The secondary sides of the MFTs are parallel-connected such that two lines carrying the low voltage high frequency current can be connected to the low voltage DC/DC converter 112 (see FIG. 1). In the figures, only one reference sign is spent for all parallel capacitors 404 and series capacitors 402 since they do not have to be identified individually.

The embodiment of FIG. 4a shows multilevel inverter cells that each are tapped by a serial capacitor 404 connected to the primary coil of a MFT 110 . . . 115, and the other end of the primary MFT coil is connected to the lower end of the respective multilevel inverter 411 . . . 414

For the embodiment shown in FIG. 4b only two MFTs 110 and 111 are required. A serial capacitor 402 taps ML inverter 411 and the cold end of the primary coil of MFT 110 taps the lower ML inverter 413. The same applies to ML inverters 413 and 414, and the MFT 111.

Figure 5:
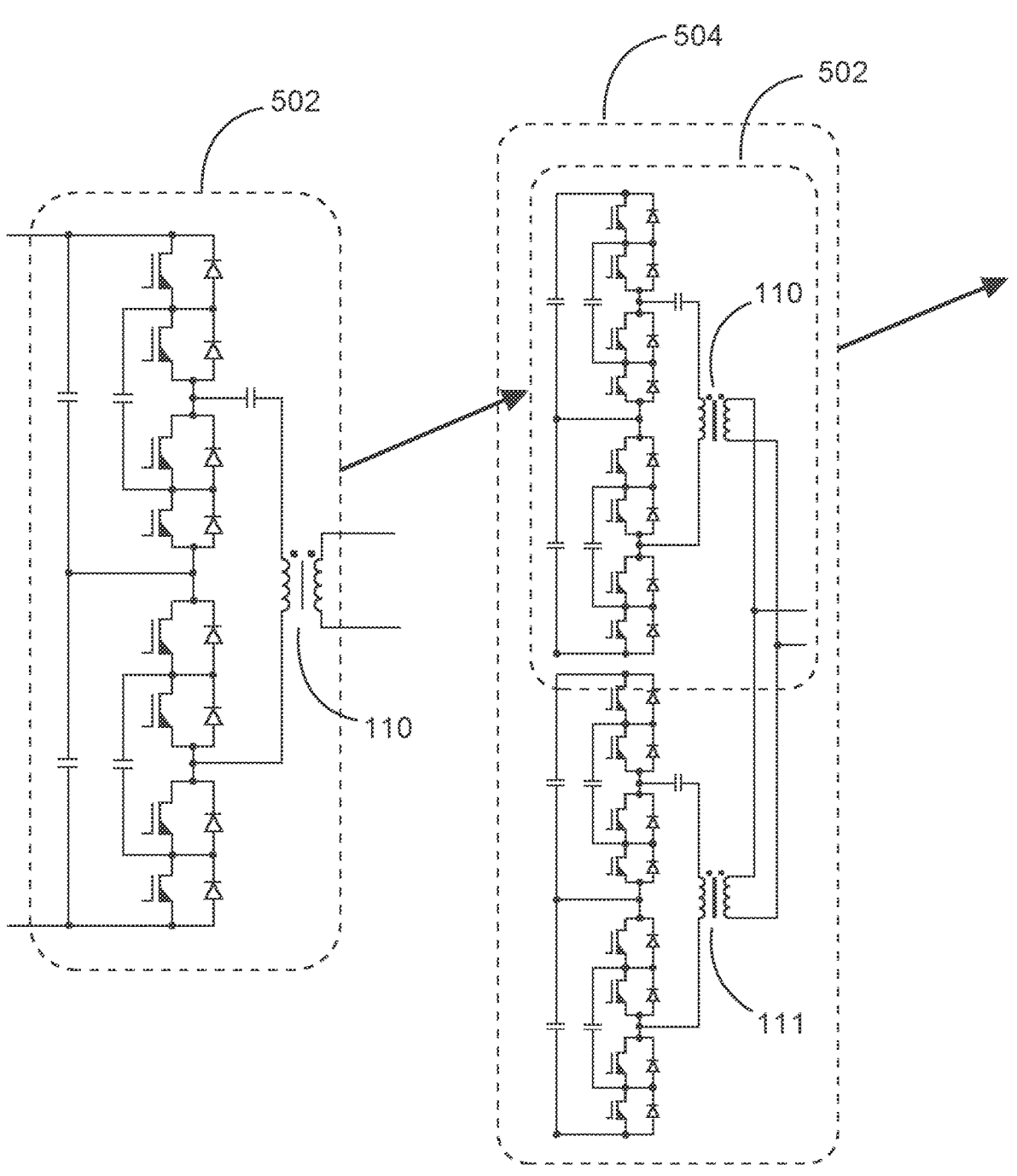
FIG. 5 shows diagrams of realizations of the MV DC/DC converter in accordance with the disclosure.

FIG. 5 shows realizations 502, 504 of the MV DC/DC converter 108. More sophisticly, it shows how to develop converters with a higher number of levels and more MFTs starting from a basic converter 502. To obtain the structure of converter 504, the structure 502 is duplicated, and the secondary coils are parallel-connected. Using this principle, any number of basic converters may be connected together in this way.

Figure 6A:
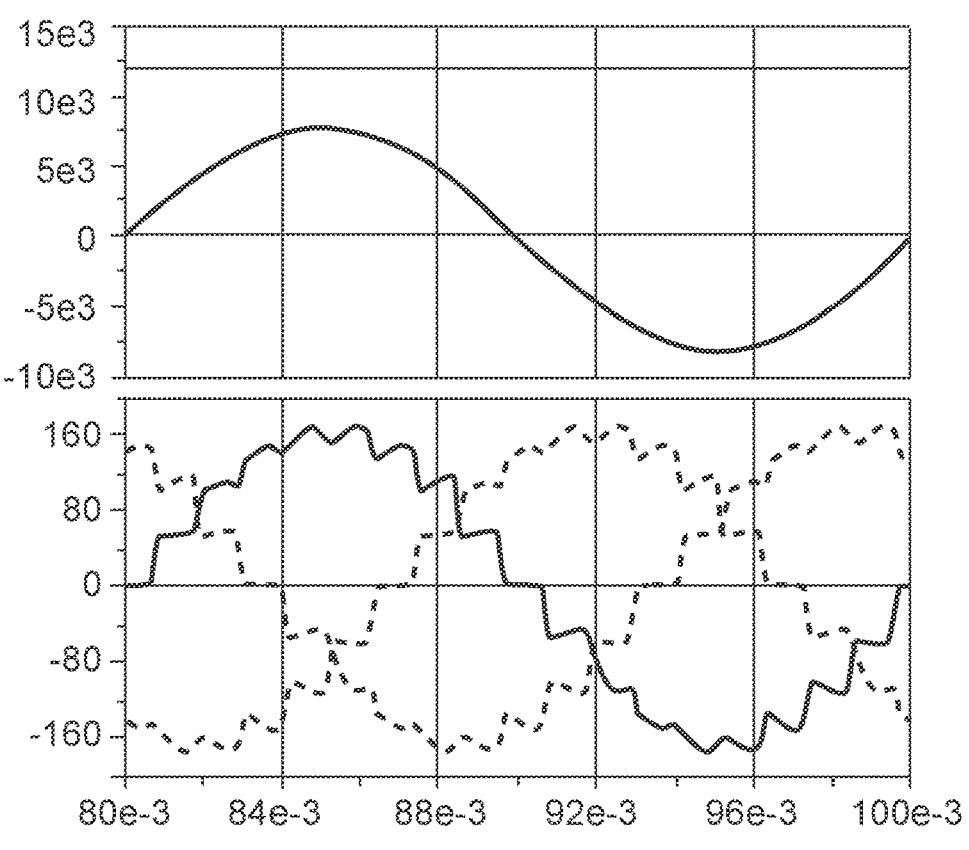
FIG. 6a shows a numerical circuit simulation of a unidirectional 18-pulse LIT rectifier in accordance with the disclosure.
Figure 6B:
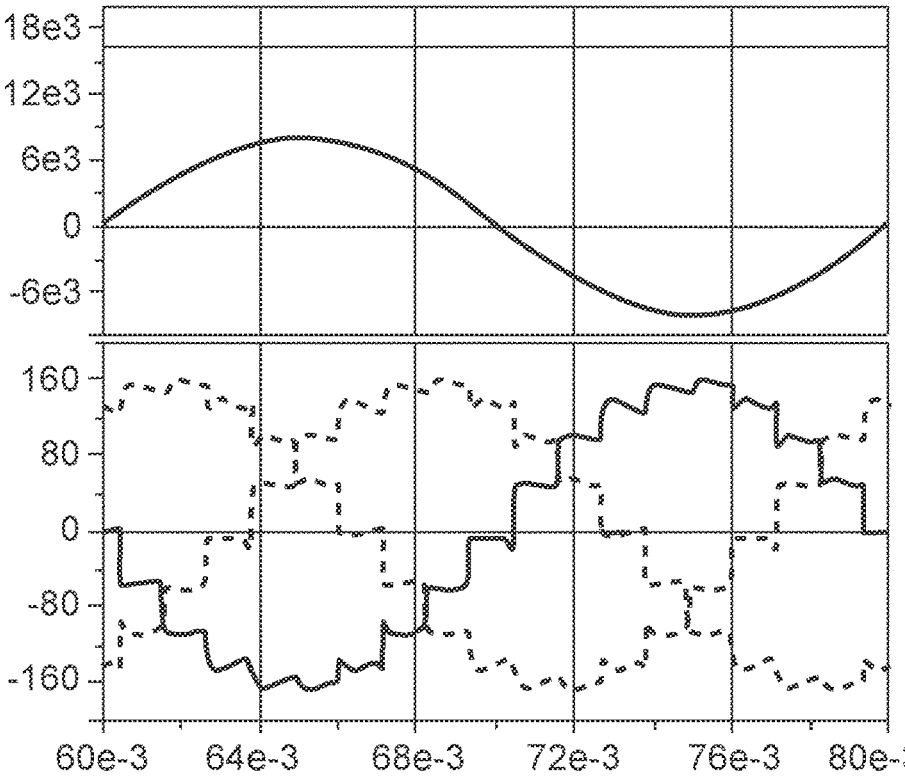
FIG. 6b shows a numerical circuit simulation of a bi-directional 18-pulse LIT rectifier.

FIGS. 6a and 6b show the DC-voltage, the sinusoidal AC grid voltage, and the three grid currents of an 18-pulse LIT based converter. The 18-pulse LIT rectifier blocks all low frequency harmonics but the 17th and 19th, and multiples of these. Minor filtering might be required to meet specific grid standards, but this can easily be done e.g. with a small grid-side inductor. FIG. 6a shows a numerical circuit simulation of a unidirectional 18-pulse LIT rectifier. The simulations are related to a 10 kV (rms, line-to-line) MV grid for a 2 MW charging station which fulfills grid standard IEEE 519. The related simulated current waveforms of the herein proposed topology that can also operate in inverter mode, i.e. deliver power from DC to AC, are shown in FIG. 6b. The active switches of the bi-directional low-frequency converters (see FIG. 3) are switched at 50 Hz at extremely low losses.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

The control of the converters can be kept simple in all operating modes, i.e., in rectifier- and in inverter-mode and contemporarily provides a very high efficiency in both modes.

Bi-directional means that the topology is capable to convert AC from the AC grid to which the LIT is connected and which usually has three phases, to a DC application, and vice versa. In order to provide bi-directionality any of the line-interphase-transformer (LIT), the plurality of bi-directional medium voltage (MV) converters, the multi-stage DC/DC converter, and the low voltage (LV) DC/DC converter has to have bi-directional capability. That is, the converters can also work as inverters. "Parallel-connection" of the plurality of bi-directional medium voltage (MV) converters on DC side means, that all converters are connected to two lines, a DC+ line and a DC− line.

The number of MV converters depends on the number of pulses of the LIT. E.g., three phases of the LIT-to-converter interface result in six pulses corresponding to one converter with three bridges or "legs".

According to an embodiment, the bi-directional medium voltage converter topology further comprises an m-stage medium frequency transformer (MFT) configured to connect the multilevel DC/DC converter and the low-voltage DC/DC converter in a galvanically isolated manner.

An m-stage MFT may consist of one or more single MFTs, i.e., .m=1, 2, 3, or any positive integer. The number m may depend on the number of levels of the multilevel DC/DC converter. The multilevel DC/DC converter and the low voltage DC/DC converter form the DC/DC converter between the bi-directional medium voltage (MV) converters and the DC application. It is noted that although they are designated as "DC/DC"-converters, they have an AC interface via the MFT(s). More specifically, in one direction, the multilevel or "multi-stage" converter has in one direction an MV DC input and generates an AC signal, from which the LV converter generates an LV DC output. In the other direction, the LV converter has a LV DC input and generates an AC signal, from which the multilevel or "multi-stage" converter generates a MV DC output. Therefore, these converters are part of the DC-DC conversion. More neutrally, they may also be referred to as "MV multilevel converters" or "MV multi-stage" converters and "LV converter".

By varying the number of cells, the semiconductors and MFTs can be optimized concerning power and MV DC link voltage. For example, the power can be increased by adding such converters, while maintaining the DC voltage or the voltage can be increased by adding such converters, while maintaining or increasing the power.

According to an embodiment, each converter of the plurality of bi-directional MV converters comprises actives switches, wherein the active switches are combinations of IGBT and diode, IGBT and thyristor, and IGBT and anti-parallel transistor.

The active switches allow the bi-directional characteristic of the MV converters. The diodes, thyristors or transistors are arranged in anti-parallel direction with respect to the IGBTs. Besides diodes and thyristors, also active switches such as IGBTs or other transistors may be used.

According to an embodiment, each converter of the plurality of bi-directional MV converters comprises actives switches, wherein the active switches comprise a MOSFET.

Alternative to the IGBT-combinations, a MOSFET can be used instead of an IGBT, such that the following combinations would be possible: MOSFET/diode, MOSFET/thyristor, MOSFET/transistor, e.g., IGBT, and MOSFET/MOSFET.

According to an embodiment, the plurality of bi-directional MV converters each is operated at low frequency.

Low frequency here means in the order of the mains frequency, that is, for example in the order of 50 Hz. The operation at such a low frequency is possible due to using a LIT.

According to an embodiment, the number n of pulses of the different pulse-numbers of the n-pulse LIT is 12, 18, 24, 36 or 48.

In principle, when having three grid phases and using bridges in the MV converters, the number of pulses is k×6. Therefore, a LIT with k×6 pulses may be used, where k can be any positive integer number.

According to an embodiment, the topology for the bi-directional MV converters is a three-level neutral-point clamped (NPC) topology.

The switches may be controlled using a PWM or a PWM-like signal derived from a simulation of the LIT.

According to an embodiment, each MV DC/DC converter comprises switch cells connected in series, wherein each switch cell comprises a combination of a transistor and an antiparallel diode, thyristor or further transistor; and wherein the MV DC/DC converter comprises capacitors that are arranged in parallel to one or more the switch cells.

The capacitors balance the voltage between the switches and provided a smooth DC voltage at the MV DC+ and MV DC− lines.

According to an embodiment, the bi-directional medium voltage converter topology further comprises medium frequency transformers for the galvanic insulation, wherein each cell is connected to the first end of a primary transformer coil and the second end of the primary transformer coil is connected to a lower side of the cell, and wherein the secondary transformer coils are parallel-connected if they are more than one.

The term "lower" relates to the technical convention that a positive DC-line is usually drawn on the top side of a circuit diagram, and a negative DC-line is usually drawn on the bottom side of a circuit diagram. When the switches are arranged in series from the positive to the negative line, the top switch is connected to the positive line and the bottom switch to the negative line. Accordingly, the "lower" side of a switch is the one in direction to the negative line, e.g. the source of an n-channel transistor, and may be to the next lower cell or switch, e.g. the drain of the next n-channel transistor. The same applies for the term "upper" correspondingly vice versa.

According to an embodiment, the bi-directional medium voltage converter topology further comprises one or more transformers for galvanic insulation, wherein an upper cell is connected to the first end of a primary transformer coil and the second end of the primary transformer coil is connected to a lower cell, and wherein the secondary transformer coils are parallel-connected if they are more than one.

This embodiment is an alternative embodiment to the previous one. Since the transformer coil is connected to two switches, the number of transformers is halved.

According to an embodiment, the upper cell is connected via a capacitor or via an inductor to the first end of a primary transformer coil.

The capacitor and the primary transformer coil form a resonance circuit. An inductor instead of a resonant capacitor in series with the MFTs may be used in order to realize a dual active bridge (DAB) converter.

According to an embodiment, the bi-directional medium voltage converter topology further comprises a controller, wherein the controller is configured to simulate a pulse LIT temporally parallel to the operation of the LIT and to use the results of the simulation for generating the control signals for the switches of the plurality of bi-directional MV converters.

That is, not the measured phases of the AC grid is used as reference for generating the PWM signal for switching the IGBTs or MOSFETs of the MV converters but simulated LIT signals. The simulation is based on the measured phases of the AC grid, e.g. by synchronizing the simulation to the measured phases or by using the measured phases as references. In this way, the switching signal are based on undisturbed, simulated LIT signals.

According to a further aspect, a use of a plurality of bi-directional MV converters is provided for realizing a LIT-based bi-directional medium voltage converter topology, wherein the bi-directional MV converters comprise active switches, and/or a DC/DC converter employing MFTs for galvanic insulation.

The listed devices in this embodiment and the LIT-based bi-directional medium voltage converter topology have the features described in this disclosure.

According to a further aspect, a power device comprising a bi-directional medium voltage converter topology as described herein is provided.

According to an embodiment, the power device is a device for generating power from renewable energy, for energy storage, for a drive, for EV charging, or for a datacenter.

Renewable energy is, for example PV solar, wind, or water energy. Storage devices are for example batteries, hydrogen cells or fuel cells, e.g., especially in the case of storage devices, power is stored and retrieved again, and therefore a bi-directional medium voltage converter topology is required.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A bi-directional medium voltage converter topology, comprising:
   a multi-pulse line-interphase-transformer (LIT) connected to a three-phase grid;
   a plurality of bi-directional medium voltage (MV) converters connected to the multi-pulse LIT on an alternating current (AC) side and connected in parallel on a direct current (DC) side; and a medium-voltage to low-voltage (MV-to-LV) DC-to-DC (DC/DC) converter with an AC interface, wherein the MV-to-LV DC/DC converter comprises:
   a bi-directional multi-stage converter connected to the plurality of bi-directional MV converters; and
   a bi-directional low voltage (LV) converter;
   wherein the bi-directional multi-stage converter and the bi-directional LV converter are connected to each other but galvanically insulated via one or more medium frequency transformers (MFTs);
   wherein the bi-directional multi-stage converter comprises a plurality of switch cells connected in series;
   wherein an upper cell of the plurality of switch cells is connected to a first end of a primary transformer coil of one of the one or more MFTs, and a second end of the primary transformer coil of the one of the one or more MFTs is connected to a lower cell of the plurality of switch cells; and
   wherein secondary transformer coils of the one or more MFTs are connected in parallel when there is more than one MFT of the one or more MFTs.

2. The bi-directional medium voltage converter topology according to claim 1, wherein each converter of the plurality of bi-directional MV converters comprises active switches, and wherein the active switches are a combination of:
   an insulated-gate bipolar transistors (IGBT) and a diode;
   an IGBT and a thyristor; or
   an IGBT and an anti-parallel transistor.

3. The bi-directional medium voltage converter topology according to claim 1, wherein each converter of the plurality of bi-directional MV converters comprises active switches, and wherein at least one of the active switches comprises a metal-insulator-semiconductor field-effect transistor (MOSFET).

4. The bi-directional medium voltage converter topology according to claim 1, wherein each converter of the plurality of bi-directional MV converters is operated at a low frequency.

5. The bi-directional medium voltage converter topology according to claim 1, wherein pulse number of the multi-pulse LIT comprises 12, 18, 24, 36 or 48.

6. The bi-directional medium voltage converter topology according to claim 1, wherein each of the plurality of switch cells comprises a combination of a transistor and one of an antiparallel diode, a thyristor or a further transistor; and wherein the bi-directional multi-stage converter further comprises capacitors that are arranged in parallel to one or more of the plurality of switch cells.

7. The bi-directional medium voltage converter topology according to claim 1, wherein the upper cell is connected via a capacitor or via an inductor to the first end of the primary transformer coil of the one of the one or more MFTs.

8. The bi-directional medium voltage converter topology according to claim 1, wherein the bi-directional medium voltage converter topology is configured to simulate a pulse LIT concurrently with the operation of the multi-pulse LIT and to use results of the simulation for generating control signals for switches of the plurality of bi-directional MV converters.

9. A bi-directional medium voltage converter topology, comprising:
   a multi-pulse line-interphase-transformer (LIT) connected to a three-phase grid;
   a plurality of bi-directional medium voltage (MV) converters connected to the multi-pulse LIT on an alternating current (AC) side and connected in parallel on a direct current (DC) side; and a medium-voltage to low-voltage (MV-to-LV) DC-to-DC (DC/DC) converter with an AC interface, wherein the MV-to-LV DC/DC converter comprises:

a bi-directional multi-stage converter connected to the plurality of bi-directional MV converters; and a bi-directional low voltage (LV) converter;

wherein the bi-directional multi-stage converter and the bi-directional LV converter are connected to each other but galvanically insulated via one or more medium frequency transformers (MFTs);

wherein the bi-directional multi-stage converter comprises a plurality of switch cells connected in series;

wherein each of the plurality of switch cells is connected to a corresponding first end of a primary transformer coil of a corresponding MFT of the one or more MFTs, and a lower side of each switch cell of the plurality of switch cells is connected to a corresponding second end of the primary transformer coil of the corresponding MFT of the one or more MFTs; and wherein secondary transformer coils of the one or more MFTs are connected in parallel when there is more than one MFT of the one or more MFTs.

\* \* \* \* \*